United States Patent
Luo et al.

(10) Patent No.: US 10,394,381 B2
(45) Date of Patent: Aug. 27, 2019

(54) FALSE INPUT REDUCTION SYSTEMS, APPARATUS, AND METHODS FOR AN INFORMATION PROCESSING DEVICE

(71) Applicant: LENOVO (Singapore) PTE. LTD., New Tech Park (SG)

(72) Inventors: Jun Luo, Yokohama (JP); Hiroshi Itoh, Yokohama (JP); Ryoht Nomura, Yokohama (JP); Seiichi Kawano, Yokohama (JP)

(73) Assignee: LENOVO (SINGAPORE) PTE. LTD., New Tech Park (SG)

( * ) Notice: Subject to any disclaimer, the term of this patent is extended or adjusted under 35 U.S.C. 154(b) by 112 days.

(21) Appl. No.: 15/645,717

(22) Filed: Jul. 10, 2017

(65) Prior Publication Data
US 2018/0018060 A1    Jan. 18, 2018

(30) Foreign Application Priority Data

Jul. 14, 2016    (JP) ................................. 2016-139333

(51) Int. Cl.
*G06F 1/16*      (2006.01)
*G06F 3/041*      (2006.01)
*G06F 3/0354*      (2013.01)
*G06F 3/0488*      (2013.01)

(52) U.S. Cl.
CPC .......... *G06F 3/0418* (2013.01); *G06F 1/1692* (2013.01); *G06F 3/03547* (2013.01); *G06F 3/04886* (2013.01)

(58) Field of Classification Search
CPC ............ G06F 3/03547; G06F 3/04886; G06F 3/0418; G06F 1/1692
See application file for complete search history.

(56) References Cited

U.S. PATENT DOCUMENTS

| | | |
|---|---|---|
| 5,999,895 A | 12/1999 | Forest |
| 2006/0044259 A1 | 3/2006 | Hotelling et al. |
| 2011/0216024 A1 | 9/2011 | Yang et al. |
| 2011/0291922 A1 | 12/2011 | Stewart et al. |
| 2013/0234826 A1* | 9/2013 | Sekiguchi ........ H04N 21/42201 340/5.53 |
| 2013/0321287 A1 | 12/2013 | Adamson et al. |
| 2014/0055370 A1 | 2/2014 | Fujii |
| 2014/0198046 A1 | 7/2014 | Roskind |

(Continued)

FOREIGN PATENT DOCUMENTS

| | | |
|---|---|---|
| CN | 104636070 A | 5/2015 |
| JP | 11265240 A | 9/1999 |

(Continued)

*Primary Examiner* — Muhammad N Edun
(74) *Attorney, Agent, or Firm* — Kunzler Bean & Adamson

(57) ABSTRACT

Apparatus, methods, and computer program products that can reduce false inputs to an information handling device are disclosed. Various embodiments of an apparatus include a processor of an information handling device and memory that stores code executable by the processor. The code can cause the processor to determine when a user is operating one of a keyboard and a touch pad and, in response to the user operating the one of the keyboard and the touch pad, modify an area of a valid operating region of the touch pad. A method and program product can also perform the functions of the apparatus.

20 Claims, 9 Drawing Sheets

(56) References Cited

U.S. PATENT DOCUMENTS

| | | | |
|---|---|---|---|
| 2014/0218301 A1* | 8/2014 | Tsai | G06F 1/1662 |
| | | | 345/168 |
| 2014/0368436 A1 | 12/2014 | Abzarian et al. | |
| 2015/0277598 A1* | 10/2015 | Aurongzeb | G06F 3/041 |
| | | | 345/157 |

FOREIGN PATENT DOCUMENTS

| | | | |
|---|---|---|---|
| JP | 2003256100 A | 9/2003 |
| JP | 2007094808 A | 4/2007 |
| JP | 2010009514 A | 1/2010 |
| JP | 2012242851 A | 12/2012 |
| JP | 2014016743 A | 1/2014 |
| JP | 2014052864 A | 3/2014 |
| JP | 2014052880 A | 3/2014 |
| JP | 2014204169 A | 10/2014 |
| JP | 2014212419 A | 11/2014 |
| JP | 2016066311 A | 4/2016 |
| WO | 2010/140282 A1 | 12/2010 |

\* cited by examiner

FALSE INPUT REDUCTION SYSTEMS, APPARATUS, AND METHODS FOR AN INFORMATION PROCESSING DEVICE

CROSS-REFERENCE TO RELATED APPLICATIONS

This patent application claims priority to Japan Patent Application No. JP2016-139333 filed on 14 Jul. 2016 for Luo, et al., the entire contents of which are incorporated herein by reference for all purposes.

FIELD

The present disclosure relates to computing systems and apparatus, and more particularly, to false input reduction systems, apparatus, and methods for an information processing device.

BACKGROUND

Conventional computing devices use a keyboard and a mouse for user inputs. For example, Japanese Patent Application No. 2014-52864 discloses a computing device that includes a mode switching unit that can switch between a key input mode in which user inputs via a software keyboard can be performed and a touch pad mode in which user inputs can be performed via a pointing device.

BRIEF SUMMARY

With recent widespread use of information processing devices including touch panel displays as image display units, an information processing device that enables a key input with a software keyboard (e.g., an on-screen keyboard (OSK) or a screen keyboard) has been developed. That is, various embodiments provide a software keyboard on which a touch pad and a keyboard are disposed adjacent to one other instead of switching between a key input mode and a touch pad mode.

In the case where the touch pad and the keyboard are adjacent to each other, however, there may arise a situation in which the palm of a user's hand inadvertently touches the touch pad while typing and causes a false input and/or unintended input (e.g., switching of the window due to movement of a pointer (mouse cursor) to a position not intended by a user, among other false/unintended inputs). In particular, if the touch pad is disposed below the keyboard, a palm or the like can touch an upper portion of the touch pad and a false/unintended input on the touch pad can occur.

A software keyboard generally includes a flat surface and does not have a physical step or protrusion like that of a physical keyboard. Thus, it can be difficult for a user to recognize the boundary between the keyboard and the touch pad by the sense of touch, and the user may hardly notice when his/her palm or the like touches the touch pad during keyboard typing.

Various embodiments disclosed herein have been designed in view of the foregoing issues and provide an information processing device including a system, apparatus, and/or method that can reduce a false/unintentional input that can occur in response to a user unintentionally touching a touch pad.

To solve at least some issues, various embodiments provide apparatus, methods, and computer program products that can reduce false inputs to an information handling device. Various embodiments of an apparatus include a processor of an information handling device and memory that stores code executable by the processor. The code can cause the processor to determine when a user is operating one of a keyboard and a touch pad and, in response to the user operating the one of the keyboard and the touch pad, modify an area of a valid operating region of the touch pad. A method and program product can also perform the functions of the apparatus.

The various embodiments described above can reduce the number of false inputs that may occur when a user unintentionally touches a touch pad. Accordingly, the various embodiments presented herein are more reliable and/or efficient than conventional input techniques.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Various embodiments provide an information processing device including a false input reduction system and/or apparatus. Further embodiments provide methods that can reduce false/unintentional inputs in information processing devices.

Figure 1:
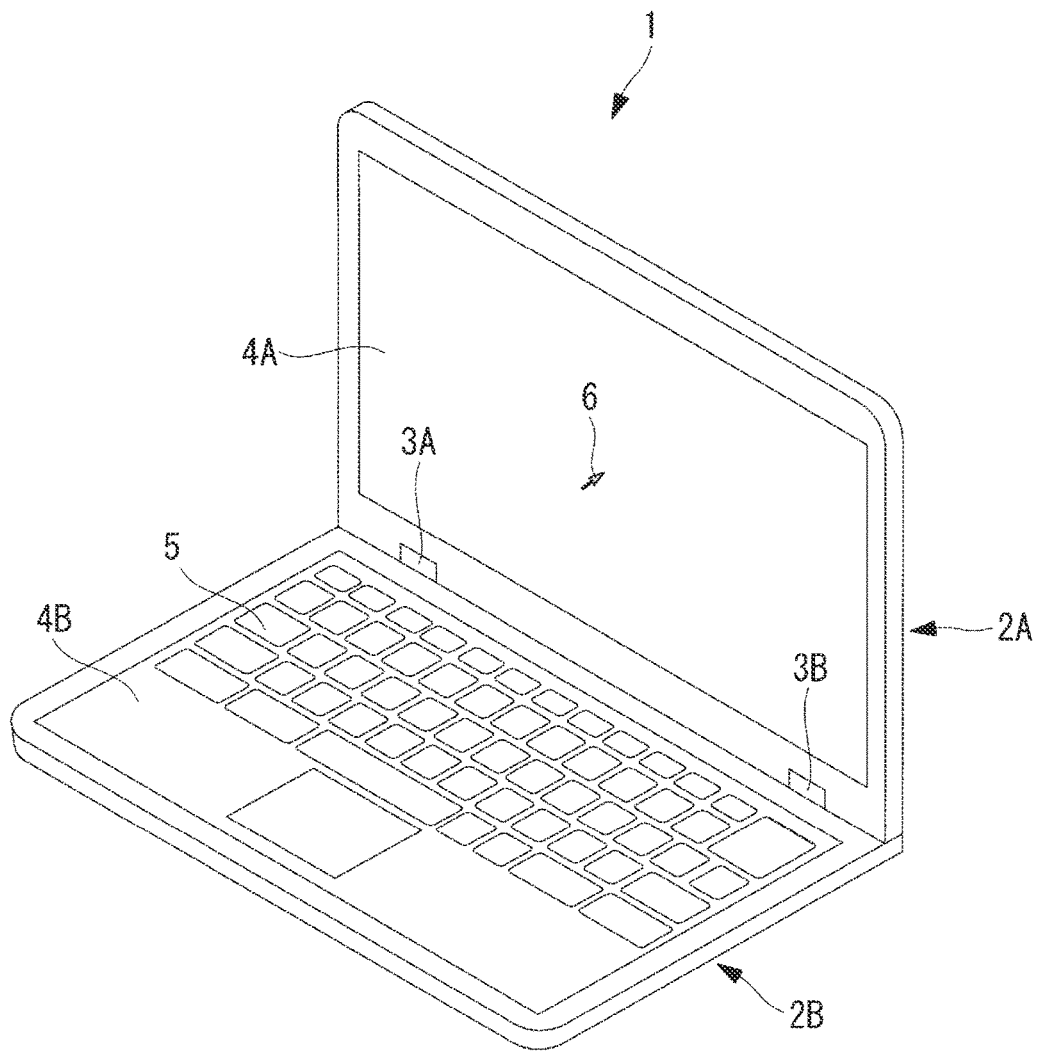
FIG. 1 is a schematic outline view illustrating one embodiment of a computing device.

FIG. 1 is a schematic outline view of a computing device 1 (e.g., a laptop personal computer (PC)) according to one embodiment. As illustrated in FIG. 1, for example, the laptop PC 1 includes, among other components, a first chassis 2A and a second chassis 2B, each of which can be solid and substantially rectangular, among other shapes that are possible and contemplated herein.

The first chassis 2A and the second chassis 2B are coupled together by a pair of left and right connectors 3A and 3B at ends thereof. The connectors 3A and 3B may be hinges and can support the first chassis 2A and the second chassis 2B so that the first chassis 2A and the second chassis 2B can be opened and closed freely.

The first chassis 2A includes a touch panel display 4A. The second chassis 2B includes a touch panel display 4B. In the following description, when the touch panel displays 4A and 4B are distinguished from each other, one of A or B is attached to the end of reference numeral 4; otherwise, A and B are omitted.

A touch panel display 4 can include a display screen and a touch sensor. The touch panel display 4 displays, on the display screen, various types of information in accordance with display data converted to video signals, and can detect a touch by an indicator such as a finger of a user, a pen, a stylus, and/or the like or an approach of the indicator with the touch sensor to thereby accept an operation input with the indicator.

The laptop PC 1 can display a software keyboard 5 (hereinafter referred to as "OSK 5") on the touch panel display 4, as a user interface for an operation input by the user. In the embodiment shown FIG. 1, the touch panel display 4B can serve as a secondary monitor/display that can display the OSK 5. Further, the touch panel display 4A serves as a primary monitor and displays various applications to be operated with the OSK 5, a window, a pointer 6 (e.g., a mouse cursor), and so forth.

Figure 2:
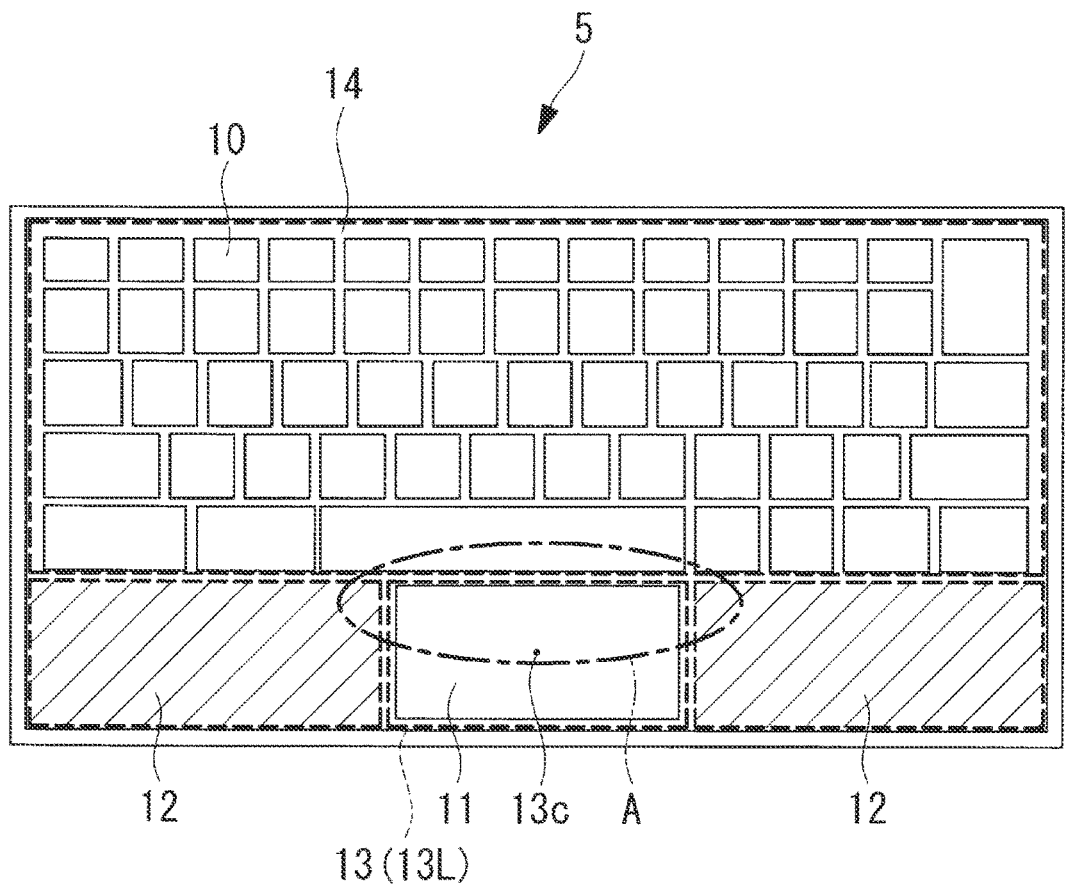
FIG. 2 is a schematic view illustrating an on-screen keyboard (OSK) included in the computing device of FIG. 1.

FIG. 2 illustrates a schematic view of the OSK 5. The OSK 5, at least in the illustrated embodiment, includes a keyboard 10 and a touch pad 11. A keyboard 10 may include various keys for receiving character inputs (e.g., alphanumeric inputs), commands, and so forth.

A touch pad 11 can be used by a user with an indicator, such as a finger of the user, for performing a pointing operation and/or a tapping operation for moving the pointer 6 displayed on the touch panel display 4A as the primary monitor. For example, the touch pad 11 may be disposed at a user side below the keyboard 10.

In association with an image indicating the keyboard 10, a valid operating region 14 for detecting an input on the keyboard 10 is provided. In association with an image indicating the touch pad 11, a valid operating region 13 for detecting an operation input on the touch pad 11 may also be provided.

Regions adjacent to the left and right sides of the touch pad 11 can serve as palm rests 12 that may be deemed invalid operating regions of the touch pad 11. Thus, even when the user touches the palm rests 12, the touch panel display 4B does not detect the touch as an operational input.

Figure 3:
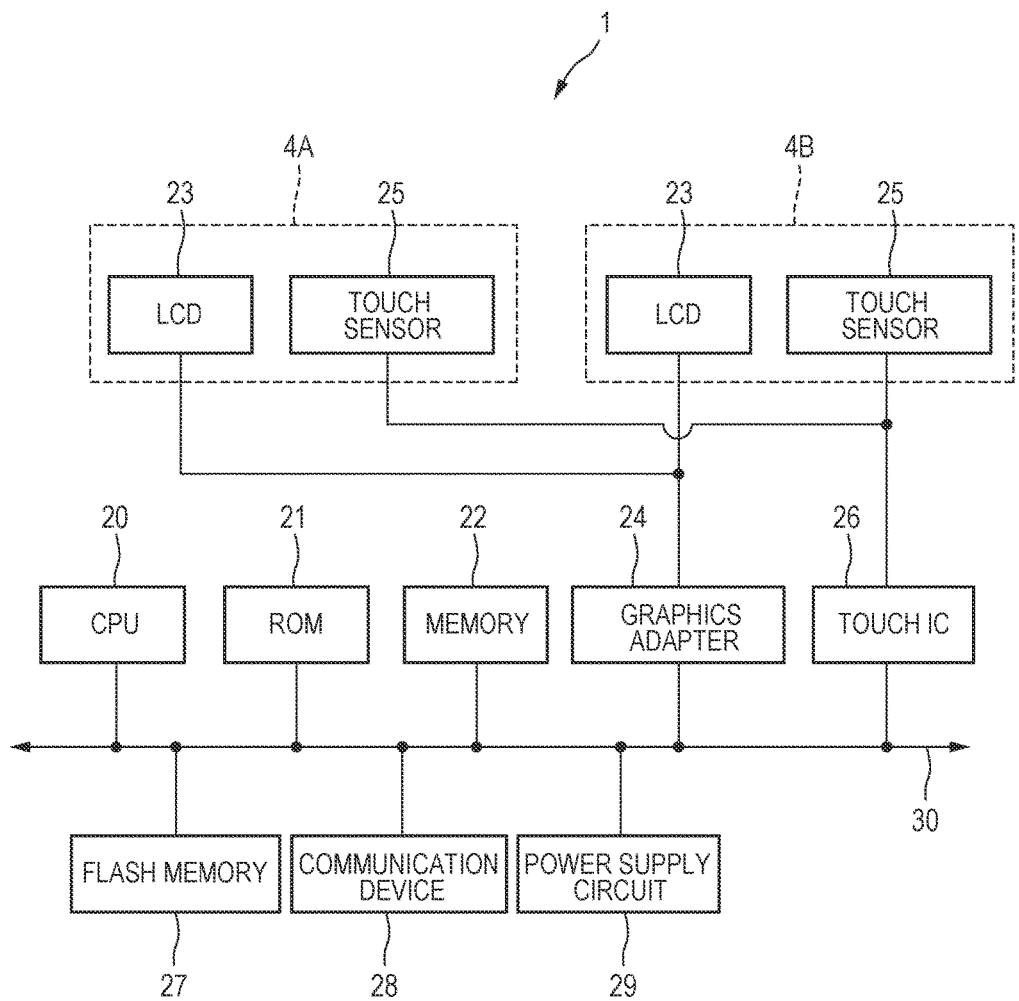
FIG. 3 is a block diagram illustrating an electrical configuration included in the computing device of FIG. 1.

FIG. 3 is a schematic view illustrating a hardware configuration of the laptop PC 1. The laptop PC 1 includes, among other components, a central processing unit (CPU) 20, a read only memory (ROM) 21, a memory 22, a liquid crystal display (LCD) 23, a graphics adapter 24, a touch sensor 25, a touch integrated circuit (IC) 26, a memory 27 (e.g., flash memory), a communication device 28, and a power supply circuit 29. These components may be directly or indirectly connected/coupled to one another via one or more buses 30. Each of the touch panel displays 4A and 4B can include a LCD 23 and/or a touch sensor 25.

A CPU 20 can control an entire laptop PC 1 by using an operating system (OS) stored in the memory 27. A CPU 20 can further execute processes in accordance with a user's operation through, for example, the touch panel display 4 based on various programs stored in the memory 27.

A ROM 21 stores a basic input/output system (BIOS), various types of data, and so forth. A memory 22 can include a cache memory or a random access memory (RAM), and is a writable memory that is used as a work area to read an execution program of the CPU 20 and write processing data based on the execution program performed by the CPU.

In response to commands from CPU 20, the LCD 23 displays a video signal from the graphics adapter 24 as an image. A graphics adapter 24 converts the displayed information to a video signal and outputs the video signal to the LCD 23 in response to the commands of the CPU 20.

A touch sensor 25 can detect a touch position of a finger of the user, a touch pen, stylus, or the like on the LCD 23 and, in response thereto, output the detected position to the touch IC 26. The touch sensor 25 receives selections of screen objects such as various menus, icons, buttons, and a keyboard displayed on the screen of the LCD 23, operation inputs such as a text input and screen operation of, for example, scrolling and swiping, and user's operations on the keyboard 10 and the touch pad 11, by detecting a touch with the user's finger, the touch pen, stylus, or the like.

A touch IC 26 can perform various processes by executing code and/or programs stored in, for example, the ROM 21 by the processor to control an operation of the touch sensor 25. That is, the touch IC 26 is a control section that executes an operation with the touch pad 11 in response to detection, by the touch sensor 25, of a touch on the valid operating region 13 of the touch pad 11.

The memory 27 can store an OS for controlling the entire laptop PC 1, various drivers for hardware operation of various types of peripheral equipment, applications for specific operations, various items of data, files, and so forth. The laptop PC 1 may include other storage units such as a hard disk drive (HDD), instead of or in addition to a flash memory 27.

A communication device 28 can communicate with other external devices. The power supply circuit 29 can include an AC adapter, an intelligent battery, a charger for charging the intelligent battery, a DC/DC converter, and so forth, and supplies electric power to the devices in accordance with operations of the CPU 20.

In some embodiments, an OSK 5 may not have a step or other physical feature at the boundary between the keyboard 10 and the touch pad 11 (e.g., region A may be enclosed by a chain line, as shown in FIG. 2). That is, the OSK 5 may include a flat or substantially flat surface. As such, while the user is typing on the keyboard 10, even if the user touches the touch pad 11 with his/her palm or the like, the user may hardly notice that he/she touched the touch pad 11. As discussed above, conventional computing devices interpret this unintended touching as an input to the touch pad 11, which results in a false input.

In view of the propensity of unintentional user touches, the laptop PC 1 has a touch pad false input reducing function to change the area of the valid operating region 13 of the touch pad 11 to reduce the number of false inputs. Specifically, the area of the valid operating region 13 of the touch pad 11 can switch between a first region 13L or a second region 13S that may be narrower than the first region 13L.

The first region 13L is the valid operating region 13, which is illustrated in FIG. 2. The second region 13S is the valid operating region 13, which is illustrated in FIG. 4.

A portion of the first region 13L not included in the second region 13S becomes an invalid operating region (e.g., the palm rest 12). Even if the user touches this invalid operating region, the touch panel display 4B does not detect/determine the touch to be an operation input.

Figure 4:
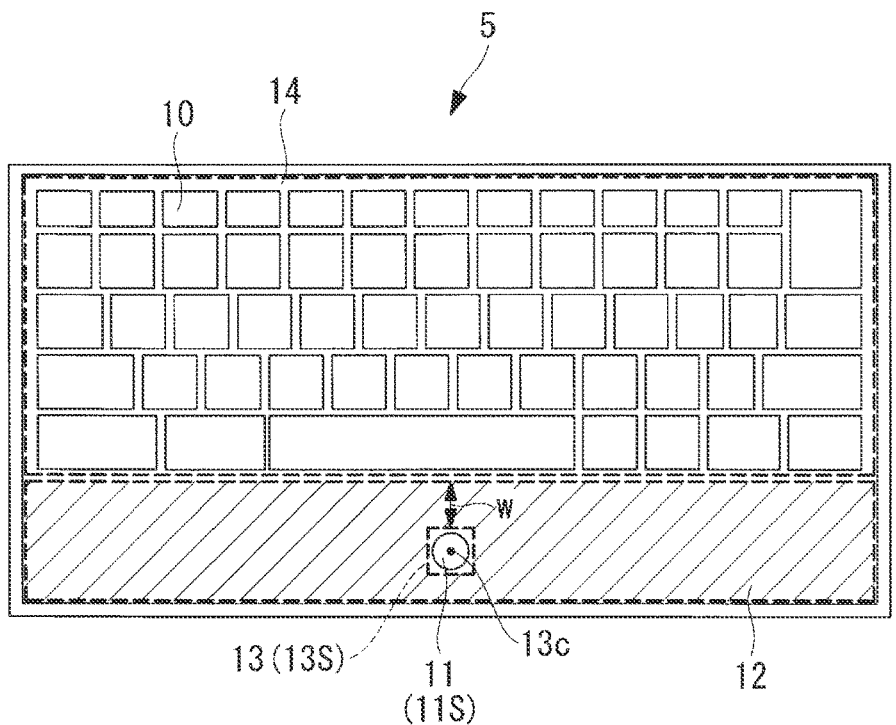
FIG. 4 is a schematic view illustrating one embodiment of an OSK that can operate in a touch pad switch mode.

In the embodiment illustrated in FIG. 4, the area of the valid operating region 14 of the keyboard 10 does not change. Further, in response to the valid operating region 13 of the touch pad 11 changes to the second region 13S, the palm rest 12 enlarges.

That is, in the case in which the user performs an operation on the touch pad 11, the laptop PC 1 according to this embodiment, reduces the area of the valid operating region 13 of the touch pad 11 so that a false input caused by a user's unintentional touch on the touch pad 11 can be reduced. On the other hand, in the case where the user performs an operation on the touch pad 11, the laptop PC 1 enlarges the valid operating region 13 of the touch pad 11 so that an operability of the touch pad 11 is not impaired.

In the following description, the touch pad 11 in which the area of the valid operating region 13 is the second region 13S will be also referred to as a touch pad switch 11S. An image on the touch pad 11 that is displayed on the touch panel display 4B when the valid operating region 13 becomes the second region 13S is also an image representing the touch pad switch 11S smaller than the touch pad 11.

In the examples illustrated in FIGS. 2 and 4, the image representing the touch pad 11 is rectangular, whereas the image representing the touch pad switch 11S is circular. In this manner, the user can intuitively know that the area of the valid operating region 13 of the touch pad 11 has become small.

Notably, while rectangular and circular shapes are illustrated in the various embodiments disclosed herein, the various embodiments are not limited to rectangular and circular shapes. That is, the various embodiments may include any other suitable shape(s) to distinguish between the touch pad 11 operating with the first region 13LL and/or the second region 13S.

The center positions 13c of the first region 13L and the second region 13S coincide with each other. In this manner, a gap "w" between the keyboard 10 and the touch pad 11 is enlarged so that an unintentional input on the touch pad 11 can be further reduced.

To begin an operation on the touch pad 11, a contact (touch) of a finger on substantially the center of the touch pad 11 is a natural operation for a user. In view of this, the center positions 13c of the first region 13L and the second region 13S are made to coincide with each other so that operability on the touch pad 11 is not impaired even when the area of the valid operating region 13 of the touch pad 11 changes size and/or shape.

As described above, the first region 13L and the second region 13S are the valid operating regions 13 having the same center position 13c and different areas. The first region 13L and the second region 13S may have similar shapes or different shapes. A state in which the valid operating region 13 of the touch pad 11 is the first region 13L will be hereinafter referred to as a touch pad mode, and a state in which the valid operating region 13 of the touch pad 11 is the second region 13S will be hereinafter referred to as a touch pad switch mode.

Figure 5:
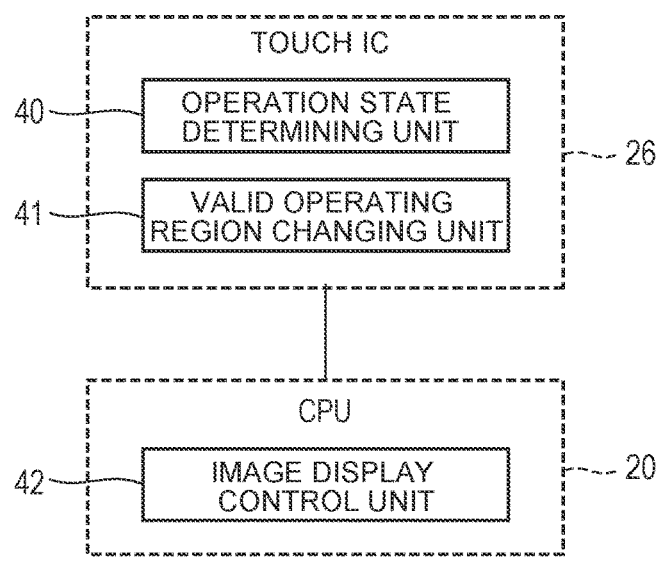
FIG. 5 is a functional block diagram of one embodiment of a touch pad including a false input reduction function.

FIG. 5 is a functional block diagram related to a touch pad false input reduction function. The touch IC 26 includes, among other components, an operational state determining unit 40 and a valid operating region changing unit 41. The CPU 20 includes an image display control unit 42.

The operational state determining unit 40 determines an operational state of the user on the keyboard 10 and the touch pad 11. The operational state on the keyboard 10 includes, for example, a first state in which the user is typing the keyboard 10, a state in which the user is not typing the keyboard 10, and a second state in which the user is performing a predetermined key input. In one embodiment, a first state from when the start of typing is recognized until when operation start on the touch pad is recognized is defined as the "state in which the user is typing" and a second state from when the start of operation of the touch pad 11 is recognized until when start of typing is recognized is defined as the "state in which the user is not typing."

The operational state on the touch pad 11 includes, for example, a first state in which the user is operating the touch pad 11 and a second state in which the user is not operating the touch pad 11. In one embodiment, a first state from when start of operation of the touch pad 11 is recognized until when the start of typing is recognized is defined as the "state in which the user is operating the touch pad 11" and a second state from when start of typing is recognized until when start of operation of the touch pad is recognized is defined as the "state in which the user is not operating the touch pad 11." In addition, the operational state determining unit 40 also determines, as an operational state, a state in which the touch panel display 4A is operated with a touch pen or stylus.

The valid operating region changing unit 41 changes the area of the valid operating region 13 of the touch pad 11 based on a determination by the operational state determining unit 40. Specifically, the valid operating region changing unit 41 changes the valid operating region 13 to the second region 13S to a state in which the user is typing the keyboard 10, and changes the valid operating region 13 to the first region 13L to a state in which the user is performing an operation on the touch pad 11.

As described above, in a situation in which the user is performing an operation on the keyboard 10, the valid operating region changing unit 41 changes a part of the valid operating region 13 of the touch pad 11 including a part adjacent to the keyboard 10, to the invalid operating region. As an example, the invalid operating region in this embodiment is a region in which the touch sensor 25 does not react (e.g., sense an input) when the user touches this region. That is, in the invalid operating region according to one embodiment, the touch sensor 25 does not execute detection of a touch with a user's finger, a touch pen, stylus, or the like itself.

The image display control unit 42 switches an image of the touch pad 11 displayed on the touch panel display 4B in accordance with the touch pad switch mode or the touch pad mode. In the touch pad switch mode, the image display control unit 42 does not display the pointer 6 on the touch panel display 4A.

In the above description, the operational state determining unit 40 and the valid operating region changing unit 41 are provided in the touch IC 26 to increase the processing speeds thereof. The various embodiments, however, are not limited to this example, and the functions of the operational state determining unit 40 and the valid operating region changing unit 41 may be executed by the CPU 20.

Figure 6:
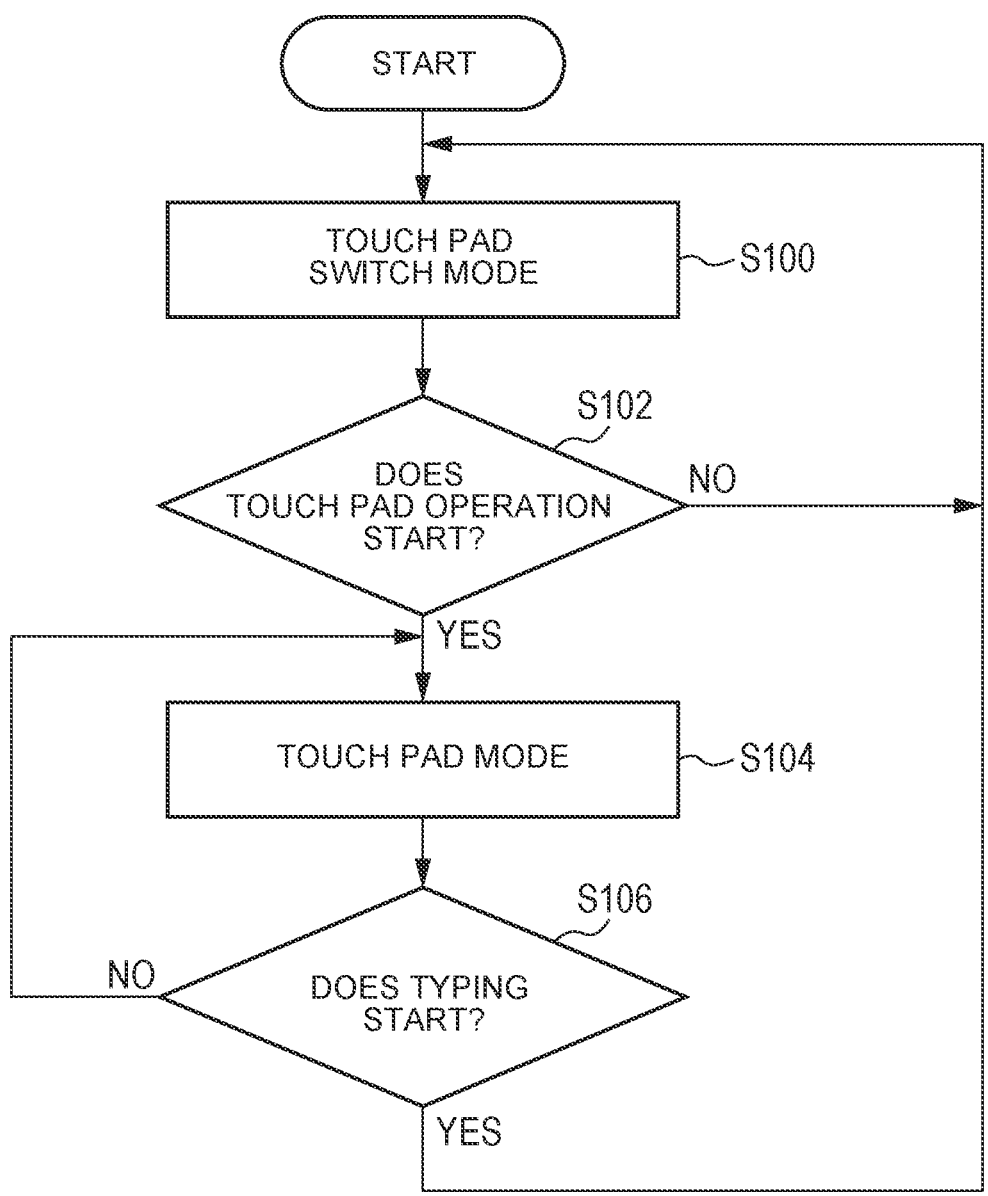
FIG. 6 is a flowchart showing the flow of an embodiment of a process of the touch pad false input reducing function.

FIG. 6 is a flowchart showing a flow of a process of the touch pad false input reducing function according to this embodiment. This process starts can start in response to the OSK 5 being activated and ends in response to the OSK 5 being finished.

First, in block S100, the touch pad switch mode is selected. In the touch pad switch mode, the pointer 6 is not displayed on the touch panel display 4A. By omitting the display of the pointer 6 in the touch pad switch mode, the user is not conscious of the position of the pointer 6 when the user starts an operation on the touch pad 11. In this manner, the user puts a finger on the center position 13c of the touch pad 11, that is, the touch pad switch 11S, and can start an operation on the touch pad 11 without consciousness of the position of the pointer 6.

In block S102, it is determined whether the touch pad switch 11S is touched to determine whether an operation on the touch pad 11 is started. In response to a touch (e.g., a YES in block S102), the process proceeds to block S104. On the other hand (e.g., a NO in block S102), the current state is the state in which typing is performed on the keyboard 10 or the state in which typing is not performed. Thus, the process returns to block S100 and the touch pad switch mode continues.

In block S104, the touch pad switch mode is initiated. In the touch pad mode, the valid operating region 13 of the touch pad 11 changes from the second region 13S to the first region 13L. At the same time, the image of the touch pad switch 11S changes to the touch pad 11. In addition, the pointer 6 is also displayed on the touch panel display 4A. The initial display position of the pointer 6 may be at the center of the touch panel display 4A or the display of the pointer 6 may start again at the position where the display of the pointer 6 was omitted.

In block S106, it is determined whether typing on the keyboard 10 is started. In response to typing (e.g., a YES in block S106), the process returns to block S100 and the touch pad mode is switched to the touch pad switch mode. On the other hand (e.g., a NO in block S106), the process returns to block S104 and the touch pad mode continues. In the touch pad switch mode, the valid operating region 13 of the touch pad 11 changes from the first region 13L to the second region 13S. At the same time, the image of the touch pad 11 changes to the touch pad switch 11S. In addition, the pointer 6 is omitted form the touch panel display 4A.

As described with reference to the flow of FIG. 6, the laptop PC 1 can dynamically switch between the touch pad switch mode and the touch pad mode in accordance with an operational state of the user on the OSK 5.

The operation input includes a combination of a predetermined key input (e.g., input to a Ctrl key, a Shift key, a Function key, or the like) and an operation on the touch pad 11. In the case of performing such an operation, if the touch pad switch mode is selected, operability to the user may be less than ideal. In view of this, in the state in which a key for performing an operation input in combination with an operation on the touch pad 11, the laptop PC 1 sets the valid operating region 13 as the first region 13L. That is, even when a key input is performed on the keyboard 10, if this key input is the predetermined key input, the mode does not switch to the touch pad switch mode, and the touch pad mode continues. Even in the touch pad switch mode, when the predetermined key input is performed, the touch pad switch mode is switched to the touch pad mode.

In a state where the user is performing a touch operation with an indicator such as a finger, stylus, or a touch pen on the touch panel display 4A as the primary monitor, the OSK 5 does not accept any of operations to the keyboard 10 and the touch pad 11. In this manner, it is possible to prevent false input from occurring when the user performing a touch operation on the touch panel display 4A erroneously touches the OSK 5 with, for example, a hand or an arm.

Furthermore, the laptop PC 1 may have a big touch pad mode that causes the entire OSK 5, that is, the regions of the keyboard 10 and the palm rests 12 to function as the touch pad 11 so that when a predetermined input is performed, the laptop PC 1 switches from the touch pad mode or the touch pad switch mode to the big touch pad mode. In this manner, the valid operating region 13 serving as the touch pad 11 is enlarged so that operability to the touch pad 11 can be enhanced.

As described above, the laptop PC 1 according to a first embodiment includes the OSK 5 in which the keyboard 10 and the touch pad 11 are disposed adjacent to each other. The laptop PC 1 determines an operational state of a user on the keyboard 10 and the touch pad 11 and, based on the determination result, changes the area of the valid operating region 13 of the touch pad 11. Thus, the laptop PC 1 according to this embodiment can reduce false input that occurs when the user unintentionally touches the touch pad 11.

A second embodiment of a laptop PC 1 will now be described. A configuration of the laptop PC 1 according to this embodiment is similar to the configuration of the laptop PC 1 according to the first embodiment illustrated in FIGS. 1 through 5, and thus, description thereof is omitted.

The laptop PC 1 according to this embodiment determines an operational state of a user on the touch pad 11, and based on the determination, switches between touch pad switch mode and the touch pad mode. Specifically, an operational state determining unit 40 according to this embodiment determines the operational state of the touch pad 11, but does not determine an operational state of the keyboard 10.

Figure 7:
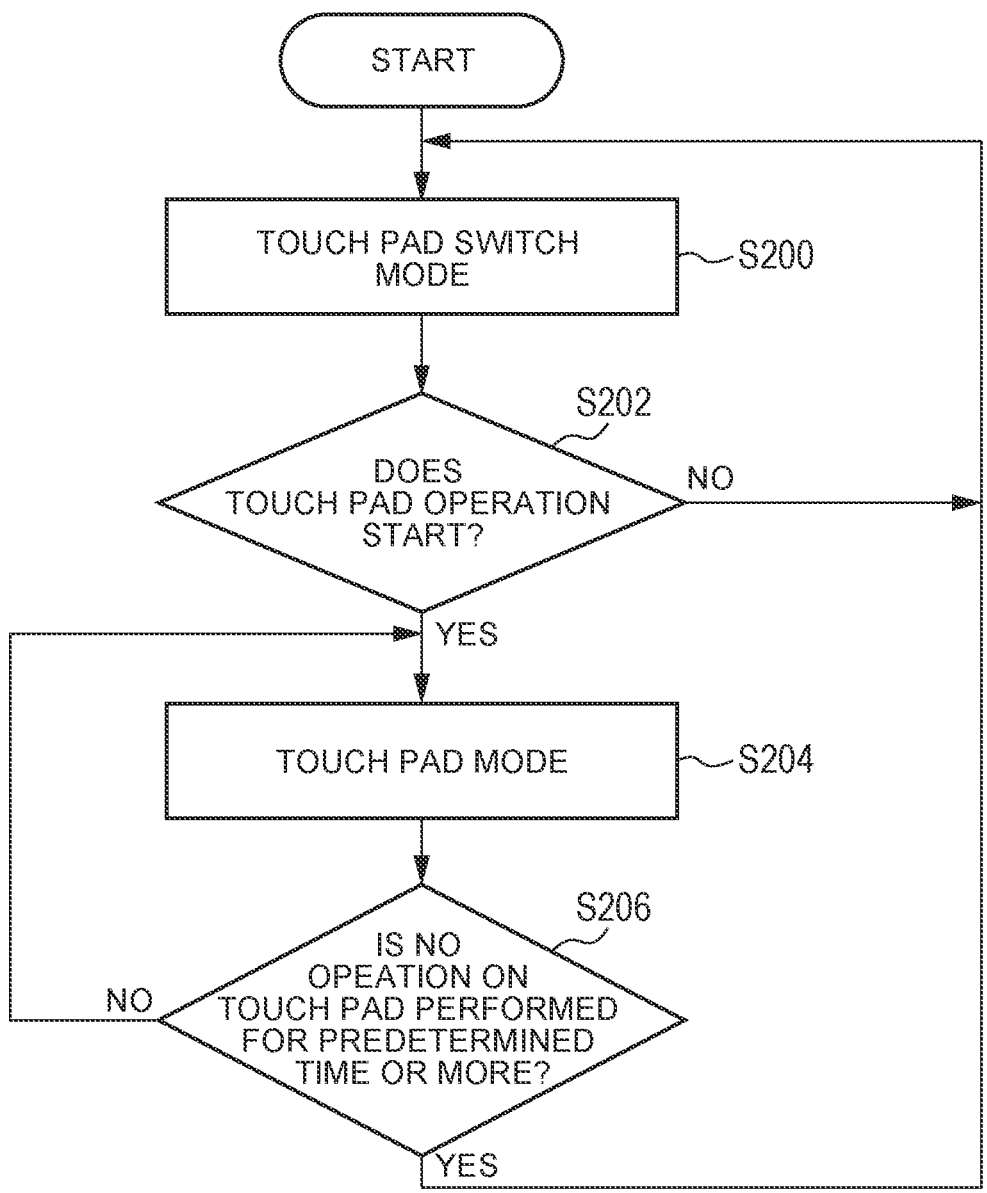
FIG. 7 is a flowchart showing the flow of another embodiment of a process of the touch pad false input reducing function.

FIG. 7 is a flowchart showing a flow of a process of a touch pad false input reduction function according to one embodiment. One process begins when an OSK 5 is activated and ends when the OSK 5 is finished.

First, in block S200, the touch pad switch mode is selected. In block S202, it is determined whether a touch pad switch 11S is touched or not to thereby determine whether an operation on the touch pad 11 is started or not. In response to a touch (e.g., a YES in block S202), the process proceeds to block S204. On the other hand (e.g., a NO in block S202), the process returns to block S200 and the touch pad switch mode continues.

In block S204, the touch pad switch mode is initiated. In block S206, it is determined whether an operation on the touch pad 11 is not performed for a predetermined time (e.g., 10 seconds) or more. In response to performance being less than the predetermined time (e.g., a YES in block S206), there is a possibility that a user is performing an operation on the keyboard 10, and thus, the process returns to block S200, and the touch pad mode is switched to the touch pad switch mode. On the other hand (e.g., a NO in block S206), it is determined that the user is performing an operation on the touch pad 11, the process returns to block S204, and the touch pad mode continues.

A third embodiment of a laptop PC 1 will now be described. A configuration of the laptop PC 1 according to this embodiment is similar to the configuration of the laptop PC 1 according to the first embodiment illustrated in FIGS. 1 through 5, and thus, description thereof is omitted.

The laptop PC 1 according to this embodiment determines an operational state of a user to a keyboard 10 and a touch pad 11, and based on the determination, switches between a touch pad switch mode and a touch pad mode.

Figure 8:
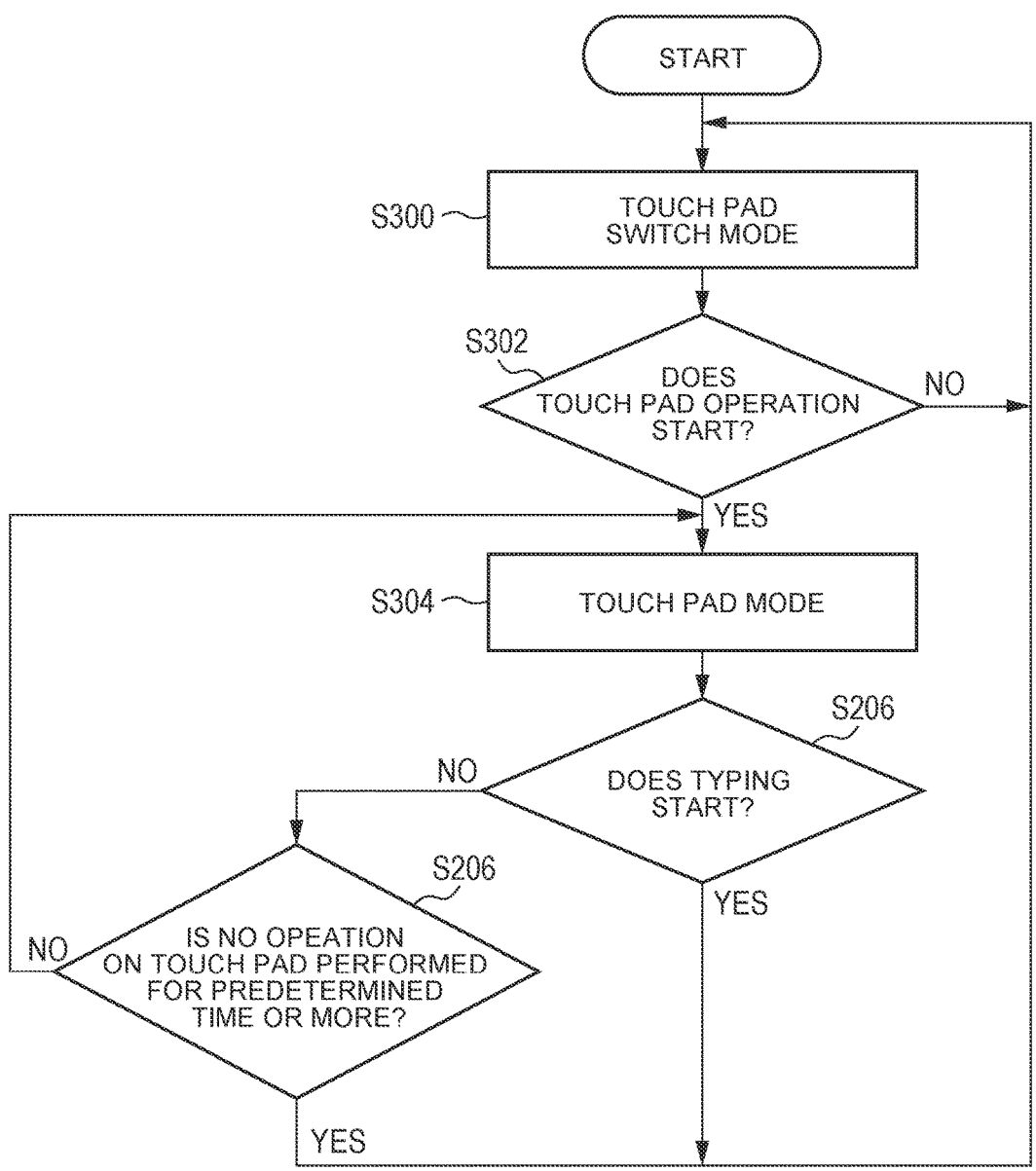
FIG. 8 is a flowchart showing the flow of yet another embodiment of a process of the touch pad false input reducing function.

FIG. 8 is a flowchart showing a flow of a process of a touch pad false input reduction function according to this embodiment. This process starts when an OSK 5 is activated and ends when the OSK 5 is finished.

First, in block S300, the touch pad switch mode is selected. In block S302, it is determined whether a touch pad switch 11S is touched to thereby determine whether an operation on the touch pad 11 is started. In response to a touch (e.g., a YES in block S302), the process proceeds to block S304. On the other hand (e.g., a NO in block S302), the process returns to block S300 and the touch pad switch mode continues.

In block S304, the touch pad switch mode is switched to the touch pad mode. In block S306, it is determined whether typing on the keyboard 10 is started. In response to typing (e.g., a YES in block S306), the process returns to block S300 and the touch pad mode is switched to the touch pad switch mode. On the other hand (e.g., a NO in block S306), the process proceeds to block S308.

In block S308, it is determined whether or not an operation on the touch pad 11 is not performed for a predetermined time (e.g., 10 seconds) or more. In response to operation being performed less than the predetermined time (e.g., a YES in block S308), there is a possibility that a user is performing an operation on the keyboard 10, and thus, the process returns to block S300, and the touch pad mode is switched to the touch pad switch mode. On the other hand (e.g., a NO in block S308), it is determined that the user is performing an operation on the touch pad 11, the process returns to block S304, and the touch pad mode continues.

A fourth embodiment of a laptop PC 1 will now be described. A configuration of the laptop PC 1 according to this embodiment is similar to the configuration of the laptop PC 1 according to the first embodiment illustrated in FIGS. 1 through 5, and thus, description thereof is omitted. The laptop PC 1 according to this embodiment starts when an OSK 5 is in a touch pad mode.

Figure 9:
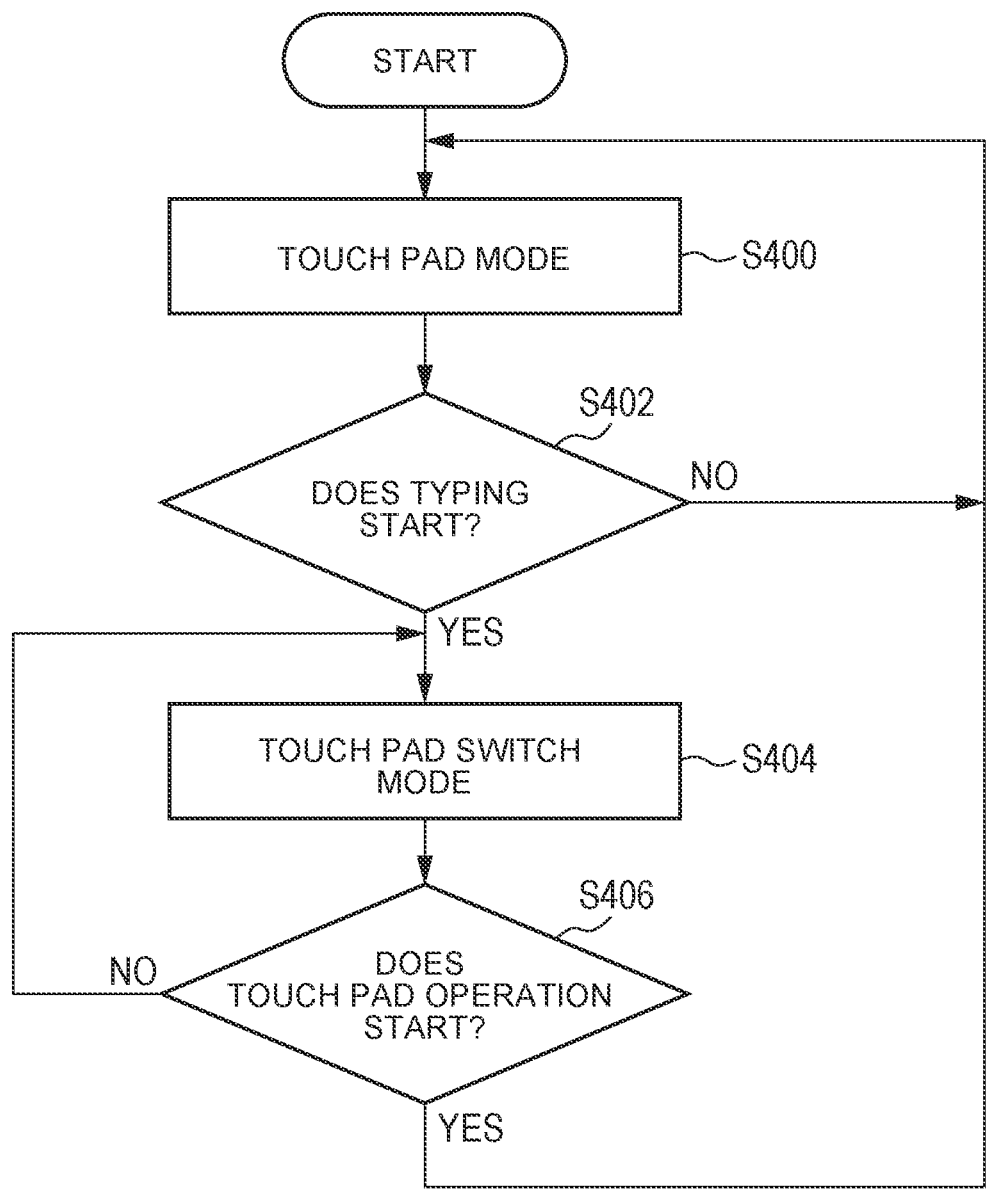
FIG. 9 is a flowchart showing the flow of still another embodiment of a process of the touch pad false input reducing function.

FIG. 9 is a flowchart showing a flow of a process of a touch pad false input reduction function according to this embodiment. This process starts when the OSK 5 is activated and ends when the OSK 5 is finished.

First, in block S400, the touch pad mode is selected. In block S402, it is determined whether typing on the keyboard 10 is started. In response to typing (e.g., a YES in block S402), the process proceeds to block S404. On the other hand (e.g., a NO in block S402), the process returns to block S400 and the touch pad mode continues.

In block S404, the touch pad mode is initiated. In block S406, it is determined whether a touch pad switch 11S is touched to thereby determine whether an operation on the touch pad 11 is started. In response to a touch (e.g., a YES in block S406), the process returns to block S400. On the other hand (e.g., a NO in block S406), the process returns to block S404 and the touch pad switch mode continues.

As a variation of this embodiment, the determination process in block S406 of the flowchart depicted in FIG. 9 may be a determination process in which it is determined whether or not an operation on the keyboard 10 is not performed for a predetermined time (e.g., 10 seconds) or more. If YES, the process returns to block S400. If NO, the process returns block S404. That is, the operational state determining unit 40 in this variation determines an operational state of the user on the keyboard 10, but does not determine an operational state on the touch pad 11.

The various embodiments have been described with reference to the drawings. The technical scope of the various embodiments, however, is not limited to the range described with reference to the drawings. Various changes and modifications may be made to the embodiments within the range of the spirit of the disclosure, and embodiments obtained by such changes or modifications are included in the technical scope of the various embodiments. Further, the embodiments may be suitably combined.

Figure 10:
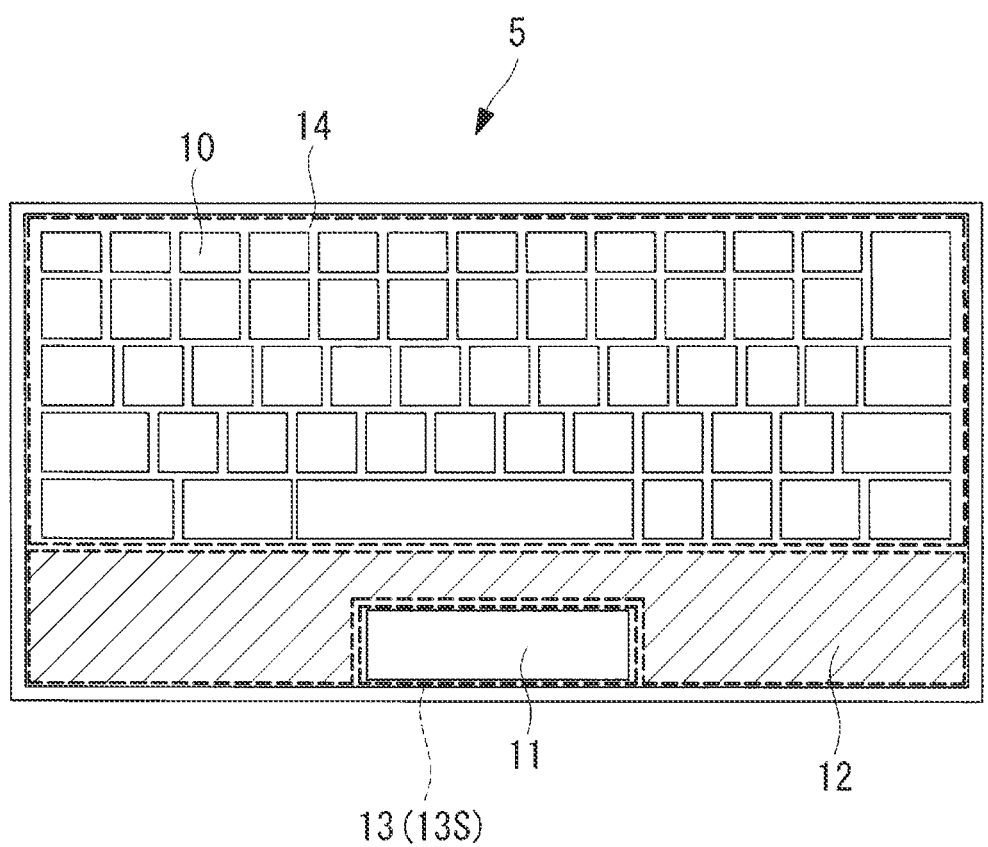
FIG. 10 is a schematic view illustrating one embodiment of a valid operating region of a touch pad.

For example, in the above embodiments, the touch pad 11 has the same center position 13c even when the valid operating region 13 changes. These embodiments, however, are not limited to this example, and the touch pad 11 may not have the same center position 13c when the valid operating region 13 changes. In this case, as illustrated in an example of FIG. 10, the valid operating region 13 of the touch pad 11 may be narrow at the side opposite to the keyboard 10 (e.g., at the user side) so that a portion of the region including a portion adjacent to the keyboard 10 is an invalid operating region.

In the above embodiments, the invalid operating region is a region where the touch sensor 25 does not react. The various embodiments, however, are not limited to this example. The invalid operating region may be, for example, a region where the touch sensor 25 reacts (senses) with a touch on this region but the touch IC 26 or the CPU 20 does not output an instruction of executing an operation such as moving of the pointer 6. In this case, if the OSK 5 is in the touch pad switch mode, since the touch sensor 25 detects an operation input, the touch pad switch mode may be switched to the touch pad mode when a continuous touch (e.g., a touch for two seconds or more) is made on the invalid operating region as well as when a touch is made on the touch pad switch 11S.

In the foregoing discussion, the various embodiments are applied to the OSK 5. The various embodiments, however, are not limited to this example, and may be applied to a physical keyboard in which a keyboard 10 and a touch pad 11 are disposed adjacent to each other. In this case, a message indicating switching of a mode may be displayed on the display so as to enable a user to recognize switching between the touch pad switch mode and the touch pad mode.

In the above embodiments, the touch pad 11 is disposed below the keyboard 10. The various embodiments, however, are not limited to this example, and the touch pad 11 may be disposed adjacent to the right or left of the keyboard 10.

In the above discussion, the various embodiments are applied to the laptop PC 1 including the two touch panel displays 4. The various embodiments, however, are not limited to this example, and may be applied to an information processing device including one touch panel display, such as a touch pad.

The various embodiments are also applicable to a flat keyboard that is a flat-surface keyboard externally connected to an information processing device, such as a touch pad through an USB port. A flat keyboard can include, for example, a touch panel and can display a software keyboard. In these embodiments, the touch pad switch 11S may be always displayed by printing, irrespective of the mode, and/or the position of the touch pad switch 11S may emit light by using a light emitting diode (LED) when the mode is switched to the touch pad switch mode.

In addition, the flows of the processes of the touch pad false input reduction functions described in the above embodiments are examples. One or more process blocks may be omitted, one or more new process blocks may be added, and/or one or more process blocks may be performed in a different order.

What is claimed is:

1. An apparatus, comprising:
 a processor of an information handling device; and
 a memory that stores code executable by the processor to:
  determine when a user is operating one of a keyboard and a touch pad,
  in response to the user operating the one of the keyboard and the touch pad, modify a first operational area of a valid operating region of the touch pad, and modify the first operational area of the valid operating region between a first region and a second region that is narrower than the first region.

2. The apparatus of claim 1, wherein the code is further executable by the processor to, in response to the user operating the keyboard, modify a portion of the valid operating region that is adjacent to the keyboard to an invalid operating region.

3. The apparatus of claim 1, further comprising:
a touch panel display configured to digitally display the keyboard and the touch pad, wherein:
the code is further executable by the processor to, in response to modifying the first area of the valid operating region, modifying a second operational area of the touch pad that is displayed on the touch panel display.

4. The apparatus of claim 1, wherein the code is further executable by the processor to, in response to determining that the user is performing operations on the keyboard, modify the valid operating region to the second region.

5. The apparatus of claim 4, wherein the code is further executable by the processor to, in response to determining that the user is performing operations on the touch pad, modify the valid operating region to the first region.

6. The apparatus of claim 1, wherein the code is further executable by the processor to, in response to determining that the user is performing operations on the touch pad, modify the valid operating region to the first region.

7. The apparatus of claim 1, wherein the code is further executable by the processor to, in response to a combination of a key input on the keyboard and a touch input on the touch pad, modify the valid operating region to the first region.

8. The apparatus of claim 1, further comprising:
a display configured to display a pointer associated with the touch pad,
wherein the code is further executable by the processor to:
in response to the valid operating region operating with the first region, display the pointer on the display, and
in response to the valid operating region operating with the second region, omit display of the pointer on the display.

9. The apparatus of claim 1, further comprising:
a touch panel display configured to receive touch inputs, wherein the code is further executable by the processor to, in response to receiving a touch input, invalidate inputs received from the one of the keyboard and the touch pad.

10. The apparatus of claim 1, wherein the second region comprises a smaller area than the first region when the second region is narrower than the first region.

11. A method, comprising:
determining, by use of a processor, when a user is operating one of a keyboard and a touch pad, wherein the touch pad comprises a valid operating region;
in response to the user operating the one of the keyboard and the touch pad, modifying an area of the valid operating region; and
modifying the area of the valid operating region between a first region and a second region that is narrower than the first region.

12. The method of claim 11, further comprising:
in response to determining that the user is performing operations on the keyboard, modifying the valid operating region to the second region.

13. The method of claim 11, further comprising:
in response to determining that the user is performing operations on the touch pad, modifying the valid operating region to the first region.

14. The method of claim 11, further comprising:
in response to a combination of a key input on the keyboard and a touch input on the touch pad, modifying the valid operating region to the first region.

15. The method of claim 11, wherein the second region comprises a smaller area than the first region when the second region is narrower than the first region.

16. A program product comprising a non-transitory computer-readable storage medium that stores code executable by a processor, the executable code comprising code to perform:
determining when a user is operating one of a keyboard and a touch pad, wherein the touch pad comprises a valid operating region;
in response to the user operating the one of the keyboard and the touch pad, modifying an operational area of the valid operating region; and
modifying the operational area of the valid operating region between a first region and a second region that is narrower than the first region.

17. The program product of claim 16, wherein the executable code further comprises code to perform:
in response to determining that the user is performing operations on the keyboard, modifying the valid operating region to the second region.

18. The program product of claim 16, wherein the executable code further comprises code to perform:
in response to determining that the user is performing operations on the touch pad, modifying the valid operating region to the first region.

19. The program product of claim 16, wherein the executable code further comprises code to perform:
in response to a combination of a key input on the keyboard and a touch input on the touch pad, modifying the valid operating region to the first region.

20. The program product of claim 16, wherein the second region comprises a smaller area than the first region when the second region is narrower than the first region.

* * * * *